United States Patent
Kaizerman (10) Patent No.: US 11,080,736 B2
(45) Date of Patent: Aug. 3, 2021

(54) ADAPTIVE IN-APPLICATION PHYSICAL PRODUCT OFFERS

(71) Applicant: Playtika Ltd., Herzliya Pituach (IL)

(72) Inventor: Idan Kaizerman, Meiter (IL)

(73) Assignee: Playtika Ltd., Herzliya Pituach (IL)

( * ) Notice: Subject to any disclaimer, the term of this patent is extended or adjusted under 35 U.S.C. 154(b) by 71 days.

(21) Appl. No.: 16/189,445

(22) Filed: Nov. 13, 2018

(65) Prior Publication Data
US 2020/0151750 A1    May 14, 2020

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0209* (2013.01); *G06Q 30/0255* (2013.01); *G06Q 30/0261* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 6,616,533 B1 * | 9/2003 | Rashkovskiy | ..... | G06Q 30/0207 463/31 |
| 9,152,984 B1 * | 10/2015 | Schoettler | .......... | G06Q 30/0209 |
| 10,482,100 B1 * | 11/2019 | Keswani | ............... | G06F 16/285 |
| 2002/0069116 A1 * | 6/2002 | Ohashi | .................. | G06Q 30/02 705/26.1 |
| 2011/0221745 A1 * | 9/2011 | Goldman | ............... | G06Q 30/02 345/419 |
| 2012/0059699 A1 | 3/2012 | Zhou | | |
| 2012/0158455 A1 * | 6/2012 | Pathak | ............... | G06Q 30/0273 705/7.29 |
| 2013/0013385 A1 * | 1/2013 | Mesaros | ............ | G06Q 30/0213 705/14.25 |

(Continued)

FOREIGN PATENT DOCUMENTS

| WO | WO-2006071246 A1 * | 7/2006 | ............. G06Q 30/02 |
|---|---|---|---|
| WO | WO-2012138786 A1 * | 10/2012 | .......... G06Q 30/0251 |

OTHER PUBLICATIONS

Samavati, Shaheen, "Israeli gaming giant Playtika acquires adtech firm Aditor", https://tech.eu/brief/playtika-acquires-aditor/, Mar. 3, 2017. (Year: 2017).*

*Primary Examiner* — Michael Bekerman
(74) *Attorney, Agent, or Firm* — Fish & Richardson P.C.

(57) ABSTRACT

Methods and systems for addressing the needs of application users such as players of social games or online games. One of the methods includes: receiving a user request to start a session in gaming software, the user request coming from a first user having a first account, the gaming software configured to provide an offer for a physical product; providing, to the gaming software, an offer for a physical product for display at a specified time by the user interface of the user device, wherein the offer and specified time are determined based at least in part on historical activity of the first account including start times and associated durations of prior gaming software sessions of the first account; detecting a user interaction with the offer for the physical product, and in response to the detection, taking an action in a process of ordering the physical product.

18 Claims, 9 Drawing Sheets

(56) References Cited

U.S. PATENT DOCUMENTS

| | | | |
|---|---|---|---|
| 2013/0090163 A1* | 4/2013 | Edson | A63F 13/335 |
| | | | 463/31 |
| 2013/0231179 A1* | 9/2013 | Sproule | G06Q 30/0269 |
| | | | 463/29 |
| 2014/0067624 A1* | 3/2014 | Babu | G06Q 30/0641 |
| | | | 705/27.2 |
| 2014/0194208 A1* | 7/2014 | Splaine | G06Q 30/02 |
| | | | 463/42 |
| 2015/0039407 A1 | 2/2015 | Liu | |
| 2015/0058140 A1 | 2/2015 | Dixon | |
| 2015/0194007 A1* | 7/2015 | Skoler | G06Q 30/0211 |
| | | | 463/17 |
| 2017/0039602 A1* | 2/2017 | Shi-Nash | G06Q 30/0271 |
| 2018/0005483 A1* | 1/2018 | Washington | G07F 17/3213 |
| 2018/0207532 A1* | 7/2018 | Mitchell | G06Q 30/0241 |
| 2019/0251603 A1* | 8/2019 | Jaatinen | G06Q 30/0275 |

\* cited by examiner

Provide one or more initial offers for one or more physical products to gaming software
410

Receive one or more indications of user interactions with the initial offers by a user of a first user account
420

Add a record of each user interaction to an account history of the first user account
430

FIG. 8B

ADAPTIVE IN-APPLICATION PHYSICAL PRODUCT OFFERS

BACKGROUND

Technical Field

This specification relates to systems and methods for addressing the needs of application users such as players of social games or online games.

Background

Applications such as social games and online games have grown dramatically in popularity. Players of social games continue to change their game playing habits and how they interact with fellow players. There is a need for systems and methods that address these changes and produce a more engaging and entertaining experience.

SUMMARY

This specification describes technologies for: determining the needs of a computer game player; based at least in part on the needs of the player, providing the player an offer for a product, e.g, a physical product, to enhance the user's experience; and facilitating the player obtaining the product through an efficient process, e.g., via an in-game offer that a player can accept with a single click. These technologies can predict when to provide an in-game offer for a non-electronic product such that the offer is more likely to satisfy a player's need or desire. Mobile and social gaming enables players to provide information to gaming servers including information such as location, age, and personal preferences. Many gaming platforms process this information and translate it into improved gameplay. The technologies described in this specification offer a player products, such as food and drink, at the right time to allow the player to play longer and to be more engaged. The term product as used in this specification means a product or service, such as a physical product or service, that cannot be provided electronically (i.e., cannot be provided as a digital good). In general, one innovative aspect of the subject matter described in this specification can be embodied in methods that include the actions of: receiving a user request to start a gaming software session in gaming software, the user request coming from a first user having a first account, the gaming software configured to run on a user device and configured to provide, via a user interface of the user device, an offer for a physical product; providing, to the gaming software, an offer for a physical product for display at a specified time by the user interface of the user device, wherein the offer and specified time are determined based at least in part on historical activity of the first account including start times and associated durations of prior gaming software sessions of the first account; detecting a user interaction with the offer for the physical product, and in response to the detection, taking an action in a process of ordering the physical product.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The operations can further include using a model of historical activity of the first account to determine when to provide the offer, the model having been generated at least in part by: collecting data describing historical activity of the first account; filtering the data based at least in part on start time and duration of gaming software sessions to determine filtered data; and training the model using the filtered data.

The filtered data can include a plurality of start times of previous gaming software sessions initiated for the first account and corresponding durations of the plurality of previous gaming software sessions. The physical product can be food from a restaurant located in a same geographic region as the first user. The model can be configured to predict a particular physical product offer with which a user will interact. Taking an action in the process of ordering the physical product can include placing an order for the physical product on behalf of the first user.

The first account can include an account history and the account history can include data indicating at least one of (i) a geographic region of the first user, (ii) an age of the first user, (iii) a gender of the first user, and (iv) a product order history of the first account.

The operations performed by the one or more computers can further include: receiving an indication of the user interaction with the offer for the physical product from the gaming software; and updating the model to reflect the user interaction with the offer for the physical product. The operations performed by the one or more computers can further include: prior to providing the offer for the physical product to the gaming software for display at the specified time, sending one or more initial offers for a physical product to the gaming software; receiving one or more indications of user interactions with the initial offers; and updating the model to reflect the one or more indications of user interactions with the initial offers. The user interaction can be a message between the second user and the first user.

Providing the offer for the physical product can be further based at least in part on a time for delivery of the physical product. The collected data can include survey data obtained from the user. Providing an offer for a physical product can include determining that a second user, who interacted with the first user through the gaming software, ordered the physical product.

Another innovative aspect of the subject matter described in this specification can be embodied in methods that include the actions of: receiving at a server a login request from gaming software on a computing device, the gaming software configured to display an offer for a physical product via a user interface of the computing device, the user request coming from a first user having a first account; determining to provide the offer for the physical product to the gaming software for display by the computing device at a specified time based at least in part on conditions of the gaming software session and an account history of the first account; providing, from the server to the gaming software, the offer for the physical product for display on the user interface of the computing device at the specified time; receiving an indication of a user interaction with the offer for the physical product, and in response to the indication, taking an action in a process of ordering the physical product. Another innovative aspect of the subject matter described in this specification can be embodied in methods that include the actions of: receiving at a server a user request from an application on a computing device, the application configured to display an offer for a physical product via a user interface of the computing device, the user request coming from a first user having a first account; determining to provide the offer for the physical product to the application for display on the computing device at a specified time based at least in part on conditions of the application session and an account history of the first account; providing, from the server to the application, the offer for the physical product for display on the user interface of the computing device at the specified time; receiving an indication of a user interaction with the offer for a physical product, and in response to the indication, initiating a process of ordering the physical product.

Still another innovative aspect of the subject matter described in this specification can be embodied in systems that include: one or more computers and one or more storage devices on which are stored instructions that are operable, when executed by the one or more computers, to cause the one or more computers to perform operations including: receiving a user request to start a gaming software session in gaming software, the user request coming from a first user having a first account, the gaming software configured to run on a user device and configured to provide, via a user interface of the user device, an offer for a physical product; providing, to the gaming software, an offer for a physical product for display at a specified time by the user interface of the user device, wherein the offer is determined by an intention predictor based at least in part on historical gaming activity of the first account and prior responses to similar offers by at least one of the first user and by other users; detecting a user interaction with the offer for the physical product, and in response to the detection, taking an action in a process of ordering the physical product. The offer can be determined by an intention predictor based at least in part on the conversion rate of the offer.

The subject matter described in this specification can be implemented in particular embodiments so as to realize one or more of the following advantages. The systems described in this specification: 1) provide users with a useful and relevant physical product offer at a time that fits the user's schedule; 2) allow the user to act on the offer with minimal distraction from the user's enjoyment of a computer game; and 3) receive the product in a timely manner. A physical product offer and ordering system described in this specification can allow longer gameplay and result in more engaged and entertained users. Also these systems can enable the consumption of products through the game application and thus allow larger revenue flow through the game. These physical product offer and ordering systems may also improve first time deposit (FTD) conversion rates.

First-time deposit (FTD) conversion is a widely used acquisition metric in the online gambling industry. It is normally calculated by dividing the number unique visitors by the number of first time deposits. The value of the first time deposit and second deposit (if there is one) is a strong indication of the potential life time value of a customer.

Additional advantages include: increasing daily activity given users have another reason to use the gaming application; and allowing game designers to use motives from the real world to enrich the game experience. For example, a game designer could allow a user to craft food within the game.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
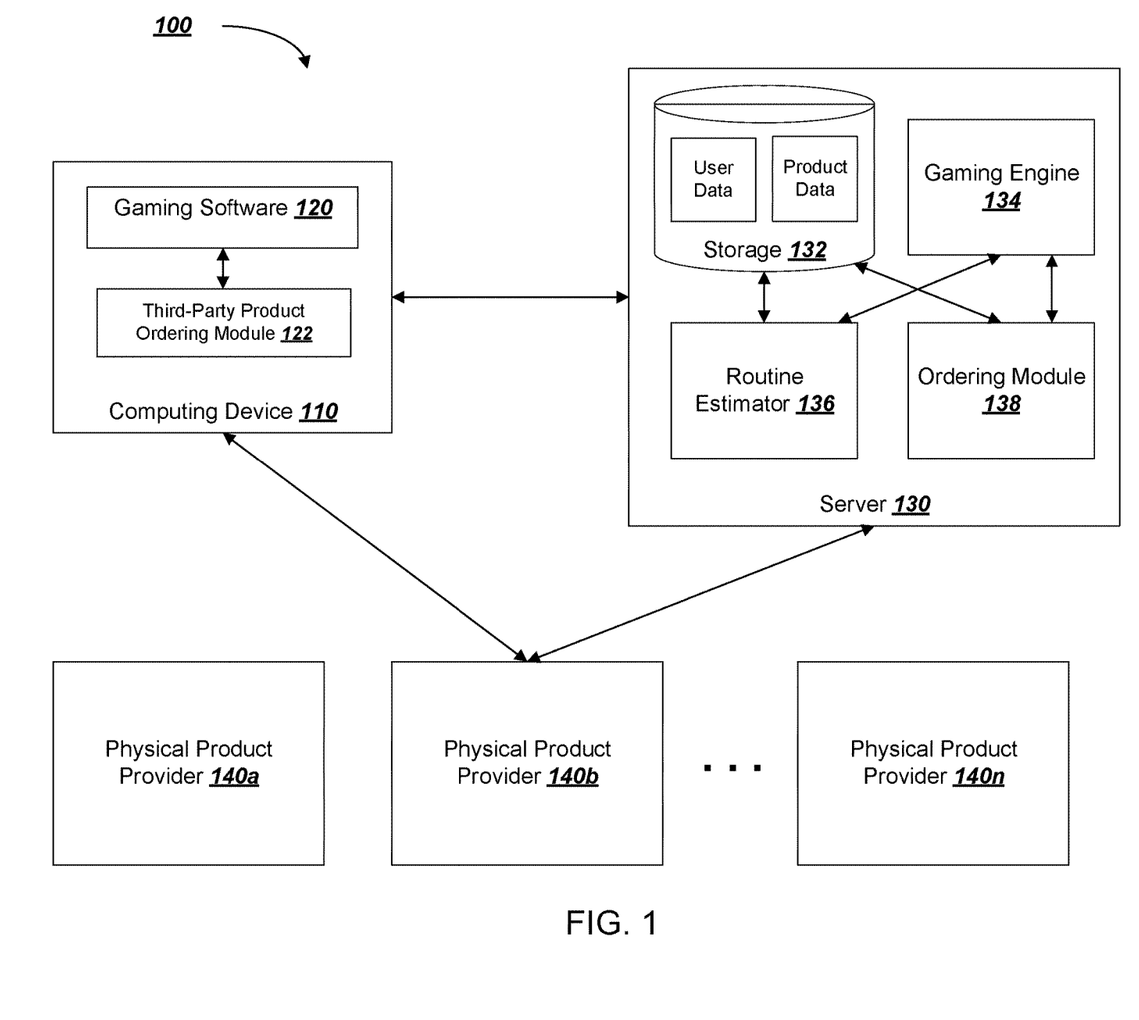
FIG. 1 is a block diagram of an example adaptive gaming system.

This specification describes technologies for: determining the needs of a computer game player; based at least in part on the needs of the player, providing the player an offer for a product, e.g., a physical product, to enhance the user's experience; and facilitating the player obtaining the product through an efficient process, e.g., via an in-game offer that a player can accept with a single click. As noted above, the term product as used in this specification means a product or service, such as a physical product or service, that cannot be provided electronically (i.e., cannot be provided as a digital good). FIG. 1 shows an example adaptive physical product offer system 100 for providing in-application, e.g., in-game product offers.

The adaptive physical product offer system 100 can include a gaming server 130 having storage 132, a gaming engine 134, a routine estimator 136 (e.g., a user routine estimator), and an ordering module 138. The gaming engine 134 communicates with gaming software 120 on a computing device 110. The computing device 110 can also include a third party product ordering module 122.

The storage 132 maintains user/player data and product data. This specification will use the term "user" and the term "player" interchangeably. The routine estimator 136 estimates a routine, e.g., a user's daily routine, based on user data in storage 132. When the estimator 136 estimates a routine and the estimated routine indicates that a user would benefit from an offer for a product, the routine estimator forwards an offer to the gaming software 120 via the gaming engine 134. The gaming software presents the offer to the user via a user interface of the computing device 110.

The user can then respond to the offer, e.g., by ordering the offered product via a third-party product ordering module 122, or by otherwise interacting with the offer. The third party product ordering module 122 can communicate the ordering data to ordering module 138 on the server 130 and the ordering module 138 can communicate with a physical product provider 140b. The ordering module 138 and the routine estimator 136 can access product data in storage 132.

Alternatively, the third-party product ordering module 122 can interact directly with a physical product provider 140b to process a user's order. In the case, where the third-party product ordering module 122 interacts directly with a physical product provider system 140b, the computing device 110 can also communicate with the server 130 the ordering data so that the server 130 can improve its determination of what to offer to a user and when to offer it. Although FIG. 1 only shows the server 130 and/or the computing device 110 interacting with one of the physical product providers 140, the server 130 and/or the computing device 110 can interact with a variety of physical product providers directly or via an application programming interface (API).

Stated differently, an example operation of an in-game physical ordering process is the following. First a user opens the gaming application from his mobile device, the client mobile device being connected to the internet. The gaming application sends a login request to the gaming server. The gaming server authenticates the user. Once the gaming server authenticates the user, the gaming application allows the user to navigate inside the application as a known user with a known user id and corresponding gaming parameters.

The user interacts with the gaming application, e.g., the user plays the game. When certain conditions are met such as length of play time, hour of the day and/or play with a specific theme (e.g., the user selects a country theme such as France or Australia), then the system offers the player a product that is related to the condition. For example, the system offers a player the opportunity to purchase a pizza and drinks from within the game if the player has been playing for more than 45 minutes and it is between noon and 2 pm. By offering to address the user's food and beverage needs from within the game, the system allows the user to stay engaged while the food is delivered.

Figure 2:
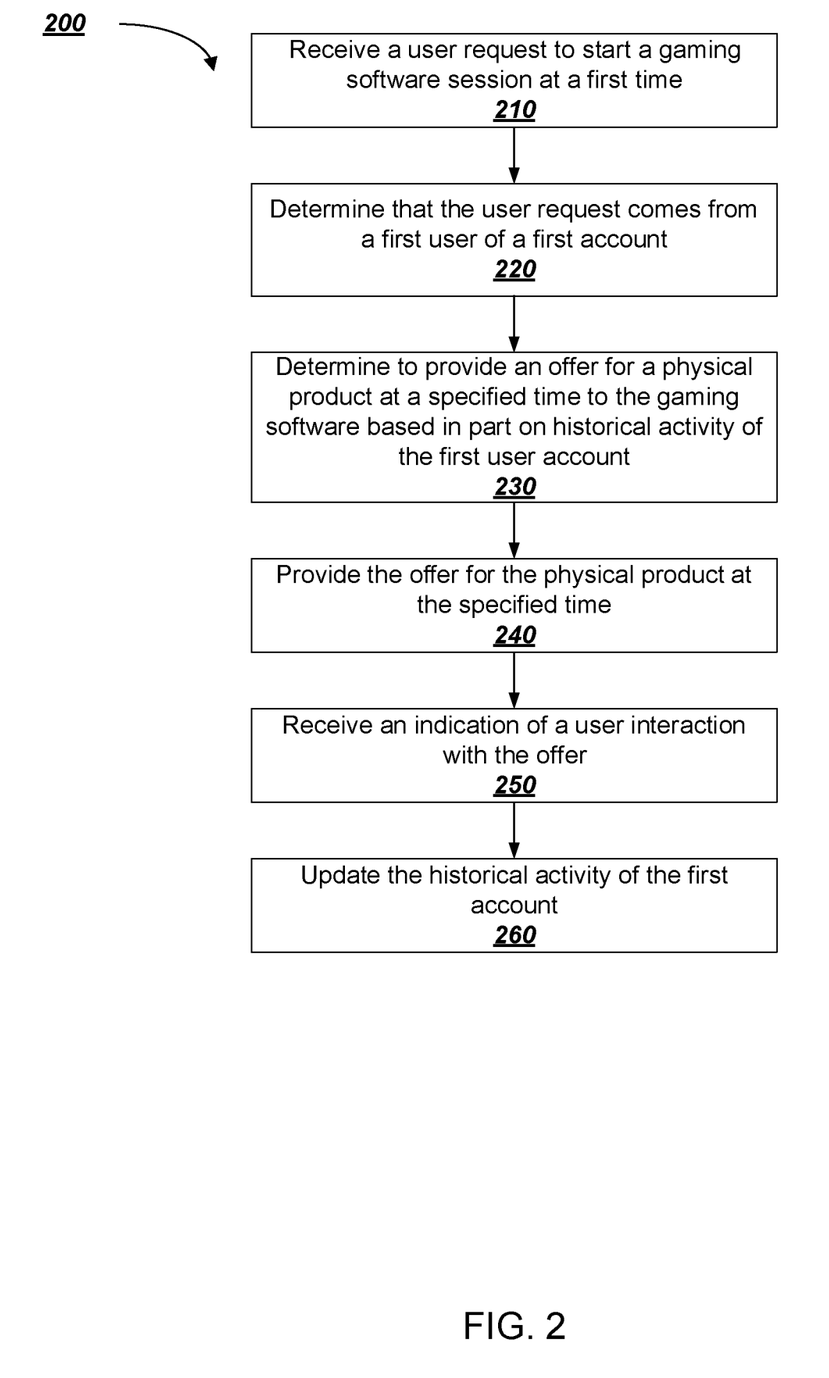
FIG. 2 is a flow chart of an example process performed by a server for providing a product offer and processing an order for the product.

FIG. 2 is a flowchart of an example process 200 for providing adaptive product offers to a user of gaming software. For convenience, the process 200 will be described as being performed by a system of one or more computers, located in one or more locations, and programmed appropriately in accordance with this specification. For example, an adaptive physical product offer system, e.g., the adaptive physical product offer system 100 of FIG. 1, appropriately programmed, can perform the process 200. The process 200 includes: receiving 210, at a server, a user request to start a gaming software session at a first time; determining 220, at a server, that the user request comes from a first user of a first account; determining 230, at a server, to provide an offer to the gaming software at a specified time, the offer being for a physical product and the offer being based at least in part on historical activity of the first user account; providing 240, from a server and at a specified time, the offer for the physical product; receiving 250, at a server, an indication of a user interaction with the offer; and updating 260, at a database, the historical activity of the first account.

Figure 3:
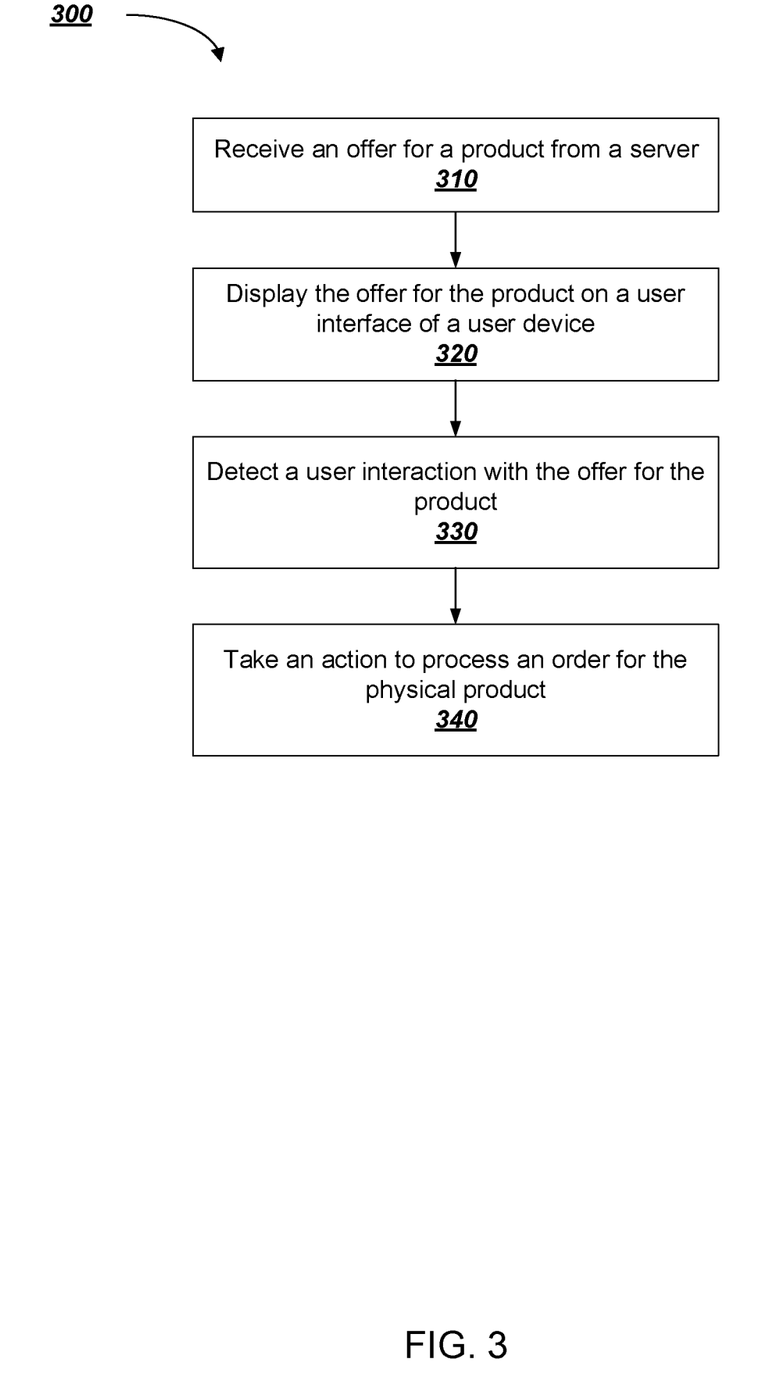
FIG. 3 is a flow chart of an example process performed by a client computing device.

FIG. 3, on the other hand, is a flow chart of an example process performed by a client computing device, e.g., the computing device 110 of FIG. 1. The illustrated process 300 includes: receiving 310 an offer for a product from a server; displaying 320 the offer for the product on a user interface of a user device; detecting 330 a user interaction with the offer for the produce; and taking an action 340 to process an order for the physical product.

Figure 4:
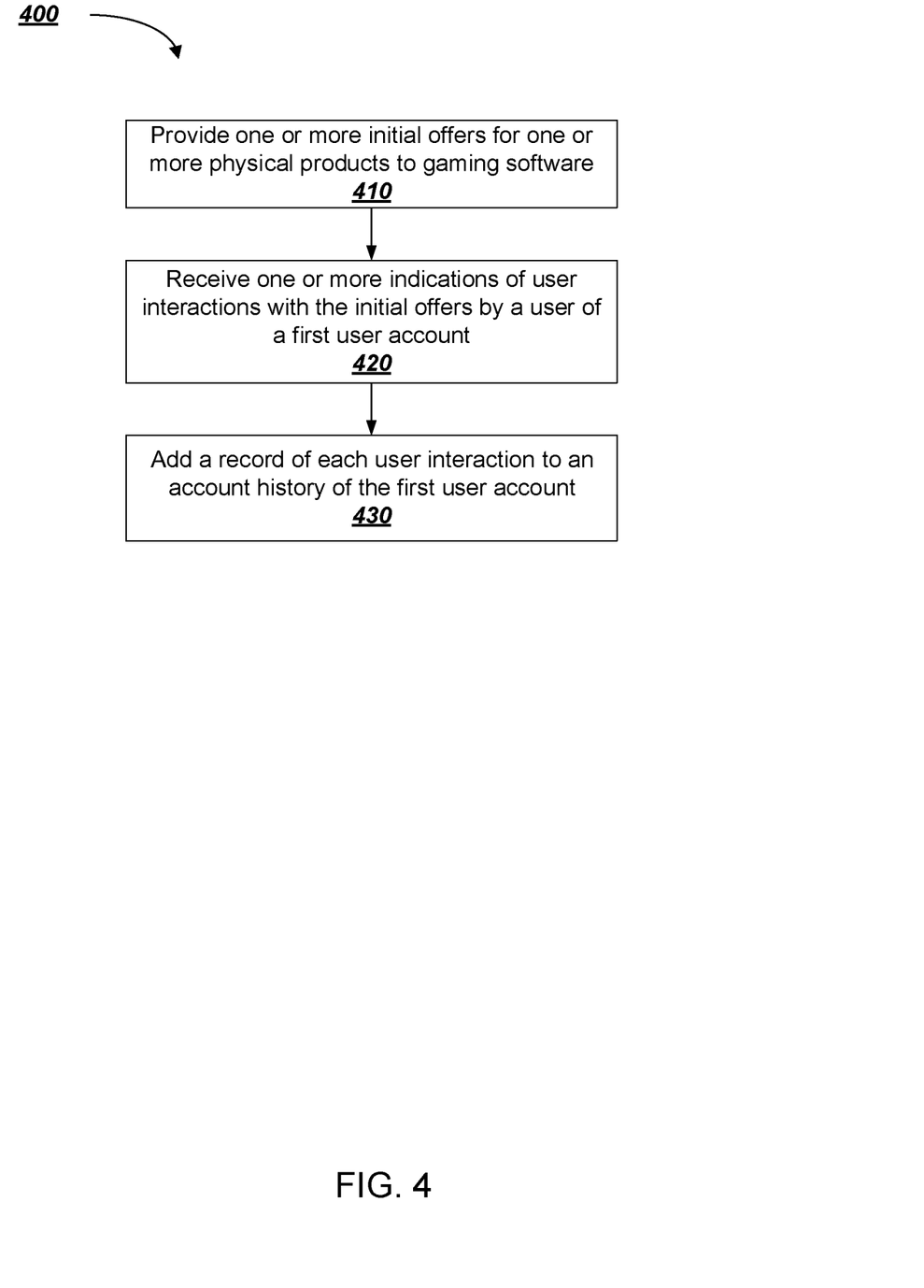
FIG. 4 is a flow chart of an example process performed by a server for recording an order history of a user account.

FIG. 4 is a flow chart of an example process performed by a server for recording an order history of a user account. The illustrated process 400 includes: providing 410, from a server, one or more initial offers for one or more physical products to gaming software; receiving 420, at a server, one or more indications of user interactions with the initial offers by a first user have a first user account; and adding a record 430 of each user interaction by the first user to an account history of the first user account.

Figure 5:
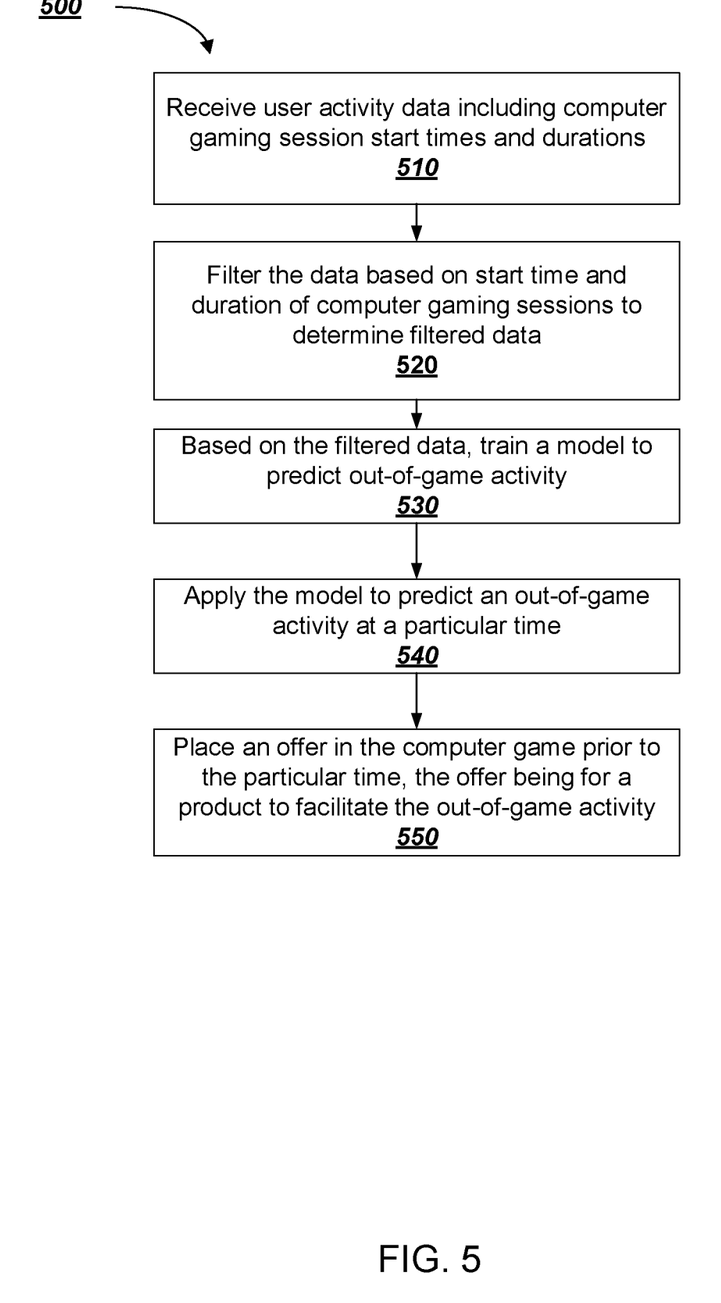
FIG. 5 is a flow chart of an example process for determining when to make product offers.

FIG. 5 is a flow chart of an example process for determining when to make product offers. The illustrated process 500 includes: receiving 510, at a server, user activity data including gaming session start times and durations; filtering 520 the user activity data based on start time and durations of gaming sessions to determine filtered data; based on the filtered data, train 530 a model to predict out-of-game activity; using 540 the model to predict an out-of-game activity at a particular time; and placing 550 an offer in the computer game prior to the particular time.

The following describes how the system of FIG. 1 processes a raw data stream. For each relevant event in the game in question, a game server stores the event and categorizes the events into three main categories: 1) Player activity—events that describe user actions in the game; 2) Game change—events that describe changes in the game program (e.g., a technology change) or a game configuration change (e.g., an art or use case change); and 3) Social activity—events that are triggered by the player outside the game and can be measured with the user's permission, e.g., using a social network linked to the user. The social network data can include country of residence, gender, age and friends.

The following table provides a few examples of event data records that can be used by the system.

| User_id | Event_ID | Event_timestamp utc | Session_ID | Event type | Event_Value | General_string |
|---|---|---|---|---|---|---|
| 1341 | 3546356 | 2016-01-15 08:36:57 | 43635 | Session start | non | |
| 1341 | 5634563 | 2016-01-15 12:26:17 | 43635 | Session end | non | |
| 1341 | 25785678 | 2016-01-15 11:56:47 | 43635 | Purchase | 100 | Dollars |
| non | 5456567 | 2016-01-15 17:15:57 | non | New room open | non | "room name" |
| 1341 | 4543563 | 2016-02-12 17:15:27 | 455221 | Face boom post | non | Post text |

In one embodiment, each event is stored with a user_id and a time stamp (i.e., event_timestamp_utc) with sufficient accuracy (e.g., with sub minute accuracy).

The following describes a features pipeline. For each user, the system aggregates raw events to produce an entire session of activity. The session is initiated by a session start (e.g., by a login event). The system declares a session end when the user is inactive for a specified period of time (e.g., when the number of events detected in a specified time window is 0).

The following table (where TS stands for time stamp) describes a few events that are encapsulated into a session database.

| Session_ID | User_id | Session_start_TS | Session_end_TS | #Purchases | Total_P_Amount |
|---|---|---|---|---|---|
| 21432345 | 3432345 | 2017-01-23 12:15 | 2017-01-23 13:15 | 1 | 100 |

The system uses session data to describe user's daily activity for at least a several day period. The system measures a user's daily activity by measuring the player activity or session duration (i.e., session end–session start).

Figure 6:
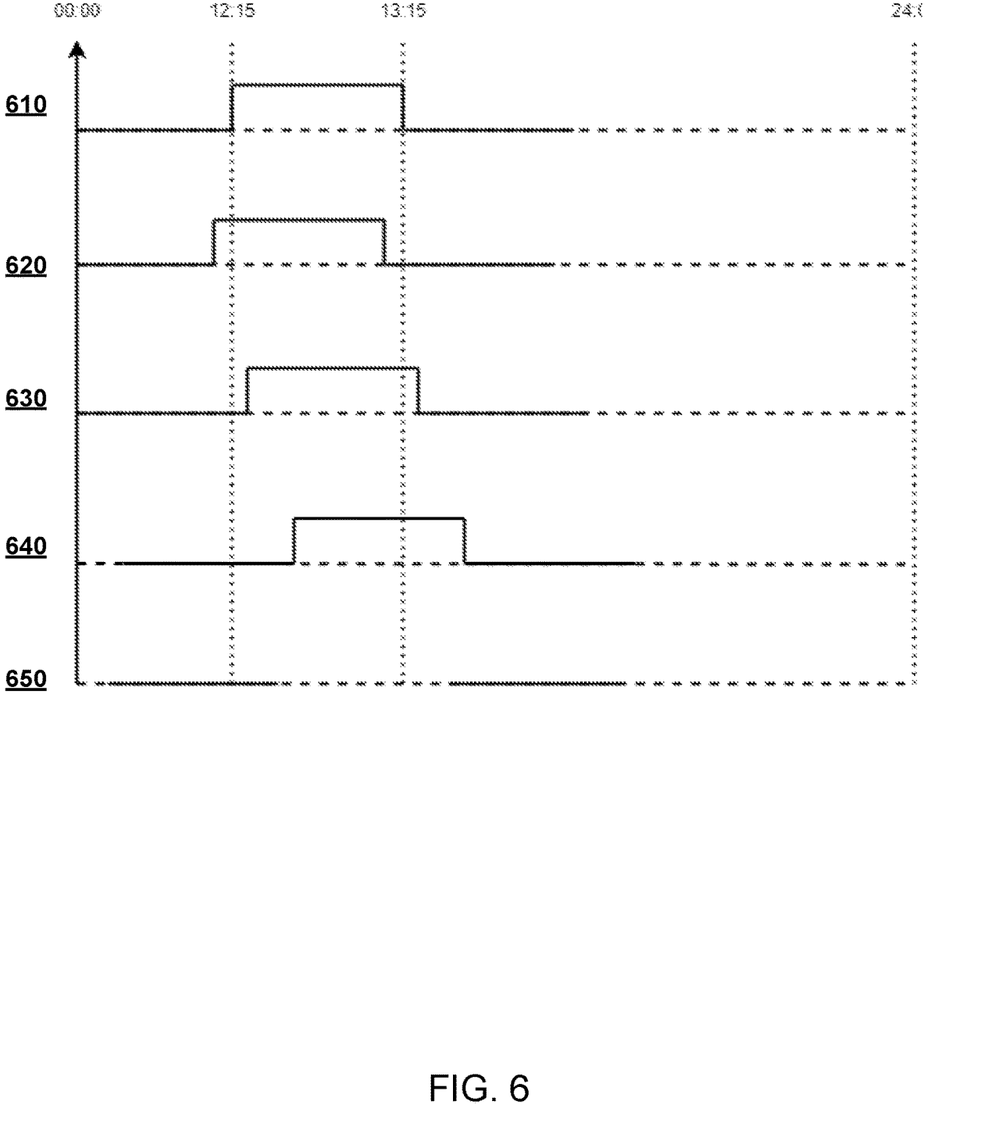
FIG. 6 illustrates one example of various game session durations for a specified user as measured and stored in the game server.

FIG. 6 illustrates user game session durations for 5 different days as measured and stored in the game server. The x axis in the graphs reflects the time in hours and minutes (i.e., HH:MM) with the hours provided according to a 24 hour clock. The y axis reflects user activity in the game. The activity on the first date 610 is between 12:15 and 13:15. On other dates (e.g., 620, 630, 640) the activity starts earlier or finishes later. Furthermore, in the last day 650 there is no activity at all during the day.

When a user is active in the game for a sufficiently long time (e.g., 14, 30 or 60 days for), a habit pattern can be estimated. The habit pattern includes an estimated start time of a typical session and its estimated duration.

Some users will have a chaotic habit that will not lead to any predictable schedule. The system can filter out such chaotic, unpredictable cases. When the system detects a strong habit, i.e., a habit estimation that is consistent with the actual player activity measurement (validated using historical data), the system can use the user activity data to predict out-of-game activities, e.g., to predict that the user in question will eat between times T1 and T2.

If the system also detects a user habit of playing for a significant duration that typically ends close to time T1, then the system can present an in-game offer for food just prior to time T1. For example, the system can present an offer, e.g., in the form of a banner ad, 15-30 min prior to time T1. In one embodiment, the offer will be actionable, i.e., the user will be able to act on the offer to order food without leaving the game.

Once the player clicks the banner offer (or order icon) the order is charged to the user's account and if the order is for a delivered item, such as delivered pizza, the delivery will be completed. In order to facilitate a one click to buy process, the player can provide the system with the following details in advance:

| e-commerce delivery address | Where to deliver | 42 st 114 w NY |
|---|---|---|
| Player name | Who to deliver to | moshe |
| Payment details | How to charge | Credit card number |
| Specific order preferences | What are important details that are specific to a product | Pizza: with tuna toppings Drinks: light sprite |

In certain embodiments, the system includes an order management and monitoring user interface for display in the computer game. An order management and monitoring user interface allows the player to see the status of his order.

Figure 7A:
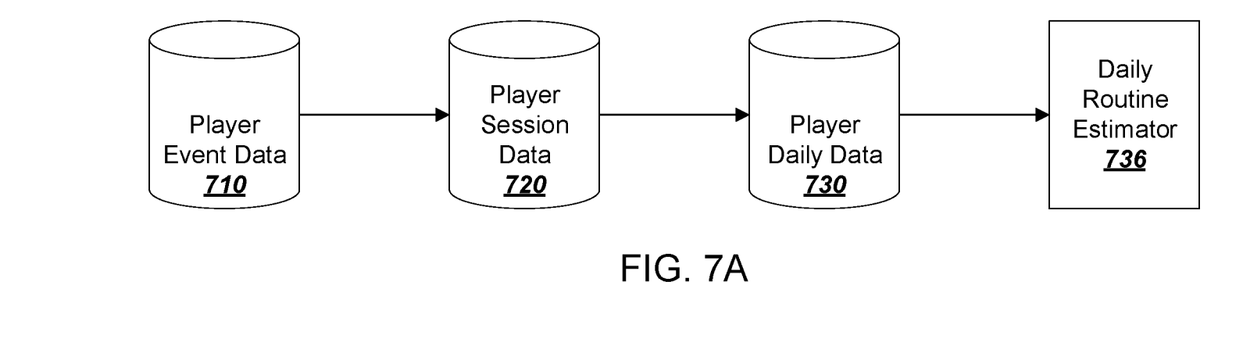
FIG. 7A illustrates one example of an approach to feature generation from raw data.

FIG. 7A illustrates feature generation from raw data and relates to the process described earlier. With reference to FIGS. 1 and 7A, an adaptive system, e.g., adaptive system 100 of FIG. 1, encapsulates user event data 710 into player session data 720 using SQL for example. The system processes session data 720 into daily habit data 730 using languages such as Scalla or python/pyspark.

Figure 7B:
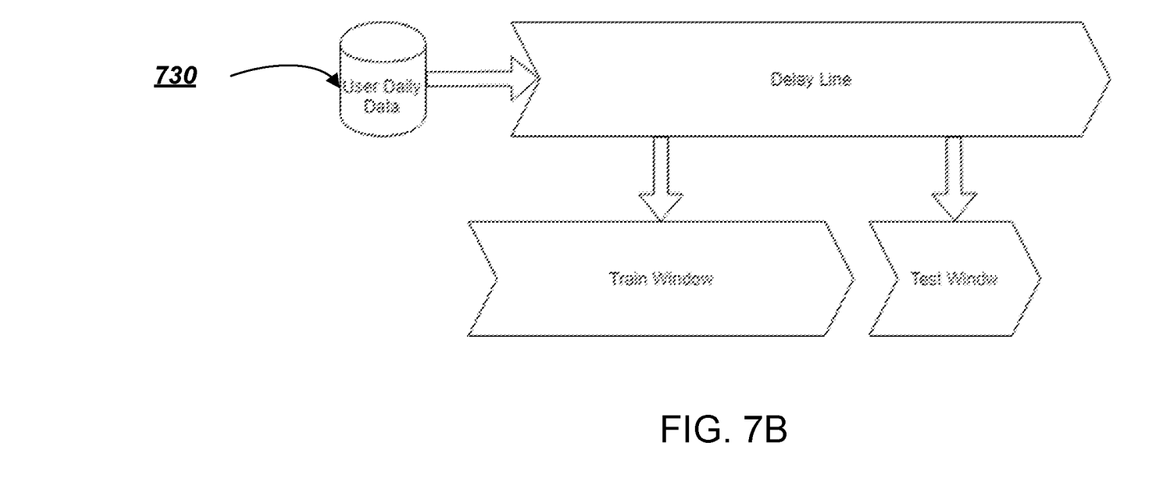
FIG. 7B illustrates a method for dividing user data into training data and testing data.

A routine estimator 736 uses the player daily data 730 to generate an estimation. The adaptive system can train a prediction model based on historical data. The training procedure divides the data into two subsets. The first subset is used for training a model (e.g., using a random forest, gradient boosted tree, logistic regression, linear regression, neural net or semidefinite program approach). The model is trained on the training data and tested on the testing subset of data. The best model or best combination of models is used to predict a future routine. FIG. 7B illustrates the division of the user data into a training subset and a testing subset. More specifically, user daily data 730 can be fed to a delay line which in turn feeds some of the data to a training window and some of the data to a test window.

The routine estimator can predict an in-game session duration for a user. Furthermore, the routine estimator can predict that if a user stops the game at a time that is within a specified amount of time of a typical lunch or dinner time then he or she is going to eat. The analysis of player activity can be based on information from in-game activity but can also be based on out-of-game activity that the system to which the system has access. Stated differently, the estimation model can process user data for a single user or for a group of users that are similar to the user in questions or for all users and the model can include a user segmentation engine that is able to identify similar users/players and thus improve the training of the estimation model.

User activity outside a computer game can be sampled using one or more of a variety of methods including via surveys and by the user granting access to user social network data. If out of game data is obtained via survey, the user can inform the system what he does during the day for a week's worth of days. If there are many players of a computer game, the survey can be applied to a small subset of the players.

If out-of-game activity is provided (with a user's permission) to the system via a social network, the social activity of the user can inform the system of the user's daily routine to allow the system to provide the user with useful and timely offers. The system can train the prediction model so that the model uses data from similar players to a player in question to predict out-of-game activities for the player in question. To determine which players are similar to a user in question, the system can filter users based on game activity features and based on information from social networks.

Figure 8A:
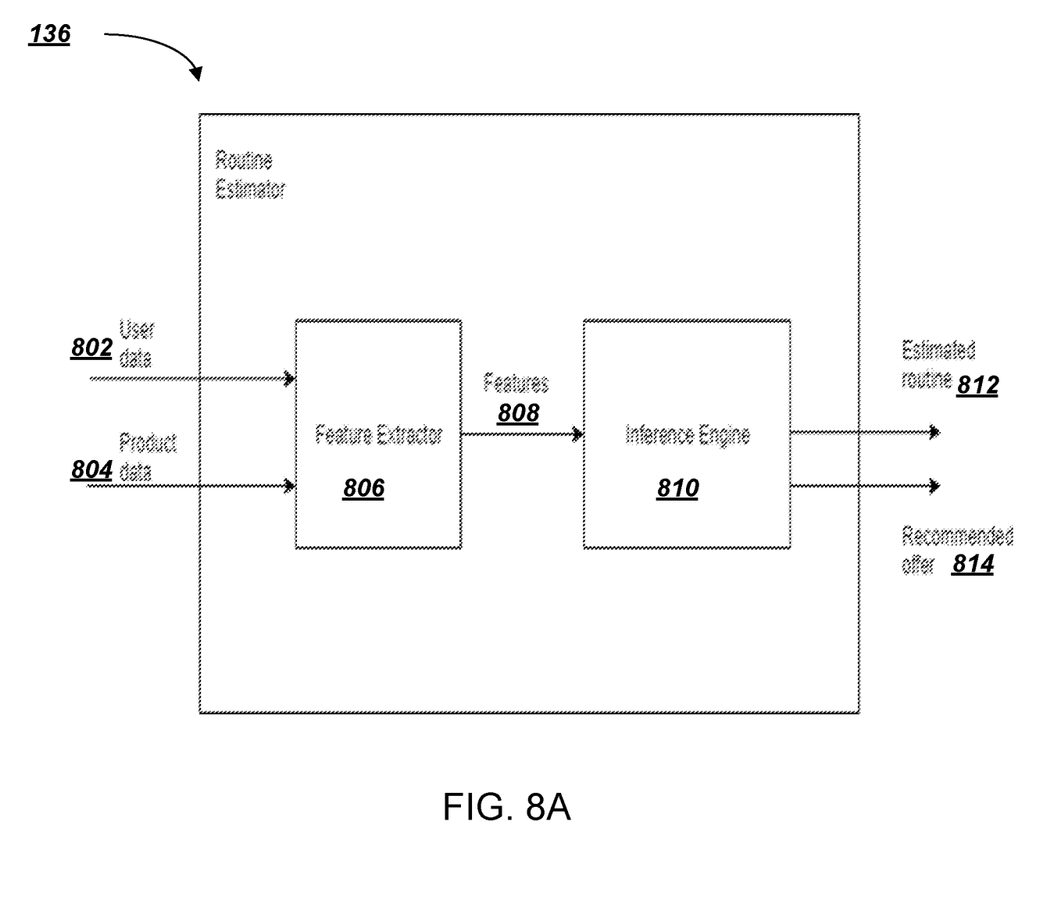
FIG. 8A is a block diagram of the routine estimator 136 of FIG. 1.

With reference to FIG. 8A and FIG. 1, user data 802 and product data 802 are streamed to a feature extraction module 806 of a routine estimator 136. User data examples include:

logging time, game coin balance, purchase events, last session duration, and time of day. Product data examples include: interactions with the app such as which screen the user is viewing, what was played recently and any game substance to which the user was exposed. Product data can also include: reactions to past product offer such as whether the user bought the product, ignored the product, cost of the product, user time-to-reaction and product feedback.

The feature extraction module processes the user data and product data to generate relevant features 808. The feature extraction module can aggregate raw features into windows such as: the last day, the last week and the last month. The feature extraction module and determine ratios between aggregations over short windows such as a day and aggregations over a large window such as a week. An example of a feature can be the session end time for each session in the last month. Features can be normalized to have zero mean and unit standard deviation.

Figure 8B:
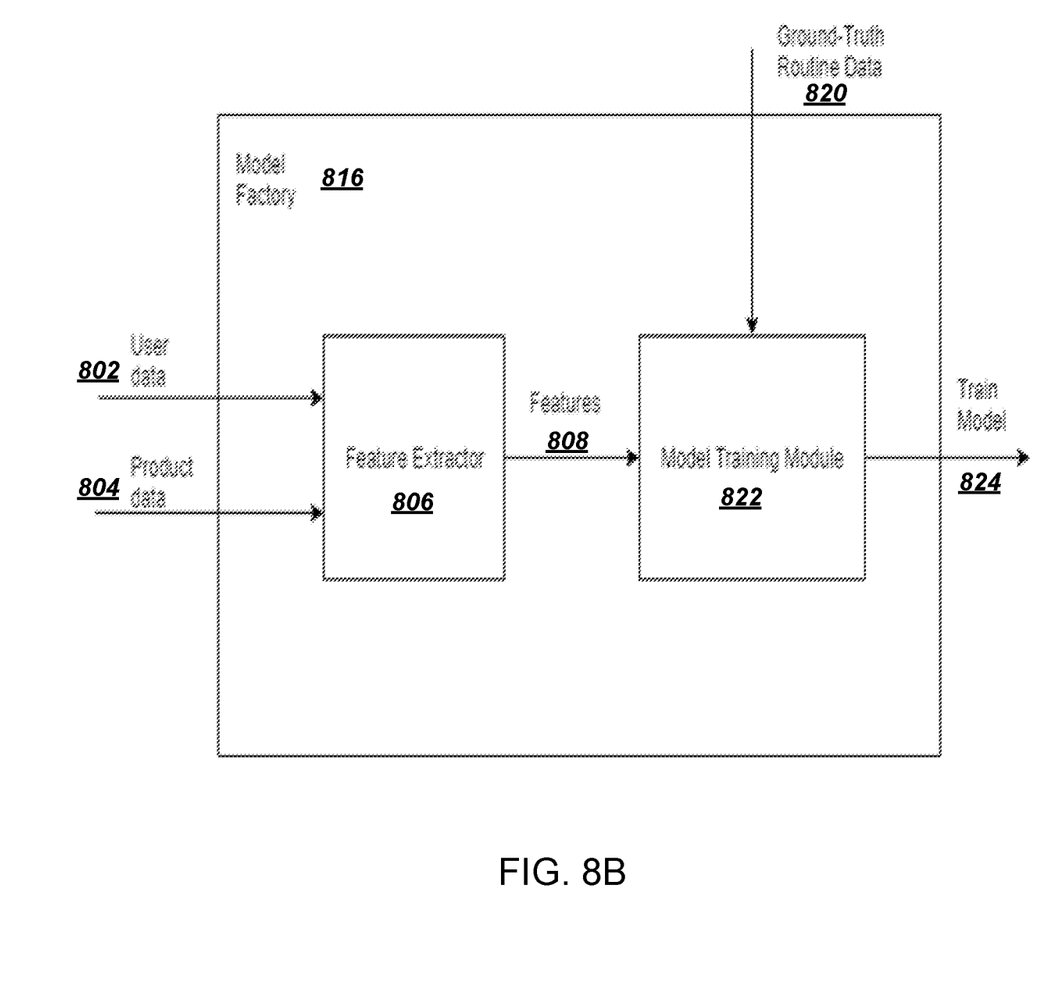
FIG. 8B is a block diagram of an example of a model factory.

The routine estimator can include an inference engine 810 that applies a trained model over the computed features to generate estimated routine data 812 (e.g., data describing the estimated routine of a user) and a recommended offer 814. To train the inference engine 810 in FIG. 8A, a model training module 822 of a model factory 816 shown in FIG. 8B receives features 808 from the feature extractor 806 as well as ground-truth routine data 820 and produces trained model data 824 that is used by the inference engine to estimate a user's routine.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" is used broadly to refer to any collection of data: the data does not need to be structured in any particular way, or structured at all, and it can be stored on storage devices in one or more locations.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprises:
one or more computers and one or more storage devices on which are stored instructions that are operable, when executed by the one or more computers, to cause the one or more computers to perform operations comprising:
receiving a user request to start a session in gaming software, the user request coming from a first user having a first account, the gaming software configured to run on a user device and configured to provide, via a user interface of the user device, an offer for a physical product;
providing, to the gaming software, an offer for a physical product for display at a specified time by the user interface of the user device, wherein the offer and specified time are determined based at least in part on: historical activity of the first account including start times and associated durations of prior gaming software sessions of the first account, wherein providing the offer for a physical product comprises determining that a second user, who interacted with the first user through the gaming software, ordered the physical product wherein providing the offer for a physical product is further based at least in part on a length of time it will take to deliver the physical product and wherein providing, to the gaming software, the offer for a physical product comprises using a routine estimation model to predict an out-of-game activity at a particular time and to determine when to provide the offer prior to the predicted out-of-game activity and wherein the offer is in response to the predicted out-of-game activity, the model having been generated at least in part by:
collecting data describing historical activity of the first account and describing out-of-game activity for the first user and for users similar to the first user obtained from at least one social network;

filtering the data based at least in part on start time and duration of gaming software sessions to determine filtered data; and
training the routine estimation model using the filtered data;
detecting a user interaction with the offer for the physical product, and
in response to the detection, taking an action in a process of ordering the physical product.

2. The system of claim 1, wherein the physical product is food from a restaurant located in a same geographic region as the first user.

3. The system of claim 1, wherein taking an action in the process of ordering the physical product comprises placing an order for the physical product on behalf of the first user.

4. The system of claim 1, wherein the first account includes an account history and the account history comprises data indicating at least one of (i) a geographic region of the first user, (ii) an age of the first user, (iii) a gender of the first user, and (iv) a product order history of the first account.

5. The system of claim 1, wherein the operations performed by the one or more computers further comprise:
prior to providing the offer for the physical product to the gaming software for display at the specified time, sending one or more initial offers for a physical product to the gaming software;
receiving one or more indications of user interactions with the initial offers; and
updating the model to reflect the one or more indications of user interactions with the initial offers.

6. The system of claim 1, wherein providing an offer for a physical product comprises:
predicting out of game activity based at least in part on social network data.

7. The system of claim 6, wherein providing an offer for a physical product comprises:
using data from similar players to the user to predict out-of-game activities for the user, wherein determining which players are similar to the user comprises filtering players based on game activity features and information for a social network.

8. The system of claim 1, wherein the filtered data includes a plurality of start times of previous gaming software sessions initiated for the first account and corresponding durations of the plurality of previous gaming software sessions.

9. The system of claim 1, wherein the model is further configured to predict a particular physical product offer with which a user will interact.

10. The system of claim 1, wherein the operations performed by the one or more computers further comprise:
receiving an indication of the user interaction with the offer for the physical product from the gaming software; and
updating the model to reflect the user interaction with the offer for the physical product.

11. The system of claim 1, wherein the collected data includes survey data obtained from the user.

12. The system of claim 1, wherein the user interaction was a message between the second user and the first user.

13. A method comprising:
receiving at a server a login request from gaming software on a computing device, the gaming software configured to display an offer for a physical product via a user interface of the computing device, the user request coming from a first user having a first account;
determining to provide the offer for the physical product to the gaming software for display by the computing device at a specified time based at least in part on conditions of the gaming software session and an account history of the first account;
providing, from the server to the gaming software, the offer for the physical product for display on the user interface of the computing device at the specified time, wherein providing the offer for a physical product comprises determining that a second user, who interacted with the first user through the gaming software, ordered the physical product, wherein providing the offer for a physical product is further based at least in part on a length of time it will take to deliver the physical product, and wherein providing, to the gaming software, the offer for a physical product comprises using a routine estimation model to predict an out-of-game activity at a particular time and to determine when to provide the offer prior to the predicted out-of-game activity and wherein the offer is in response to the predicted out-of-game activity, the model having been generated at least in part by:
collecting data describing historical activity of the first account and describing out-of-game activity for the first user and for users similar to the first user obtained from at least one social network;
filtering the data based at least in part on start time and duration of gaming software sessions to determine filtered data; and
training the routine estimation model using the filtered data;
receiving an indication of a user interaction with the offer for the physical product, and
in response to the indication, taking an action in a process of ordering the physical product.

14. A method comprising:
receiving at a server a user request from an application on a computing device, the application configured to display an offer for a physical product via a user interface of the computing device, the user request coming from a first user having a first account;
determining to provide the offer for the physical product to the application for display on the computing device at a specified time based at least in part on conditions of the application session and an account history of the first account;
providing, from the server to the application, the offer for the physical product for display on the user interface of the computing device at the specified time, wherein providing the offer for a physical product comprises determining that a second user, who interacted with the first user through the gaming software, ordered the physical product, wherein providing the offer for a physical product is further based at least in part on a length of time it will take to deliver the physical product, and wherein providing, to the gaming software, the offer for a physical product comprises using a routine estimation model to predict an out-of-game activity at a particular time and to determine when to provide the offer prior to the predicted out-of-game activity and wherein the offer is in response to the predicted out-of-game activity, the model having been generated at least in part by:
collecting data describing historical activity of the first account and describing out-of-game activity for the first user and for users similar to the first user obtained from at least one social network;

filtering the data based at least in part on start time and duration of gaming software sessions to determine filtered data; and training the routine estimation model using the filtered data;

receiving an indication of a user interaction with the offer for a physical product, and in response to the indication, initiating a process of ordering the physical product.

15. A system comprising:

one or more computers and one or more storage devices on which are stored instructions that are operable, when executed by the one or more computers, to cause the one or more computers to perform operations comprising:

receiving a user request to start a gaming software session in gaming software, the user request coming from a first user having a first account, the gaming software configured to run on a user device and configured to provide, via a user interface of the user device, an offer for a physical product;

providing, to the gaming software, an offer for a physical product for display at a specified time by the user interface of the user device, wherein the offer is determined by an routine estimation model and based at least in part on historical gaming activity of the first account and prior responses to similar offers by at least one of the first user and by other users, wherein providing the offer for a physical product comprises determining that a second user, who interacted with the first user through the gaming software, ordered the physical product, wherein providing the offer for a physical product is further based at least in part on a length of time it will take to deliver the physical product, and wherein the routine estimation model is configured to predict an out-of-game activity at a particular time and to determine when to provide the offer prior to the predicted out-of-game activity and wherein the offer is in response to the predicted out-of-game activity, the model having been generated at least in part by:

collecting data describing historical activity of the first account and describing out-of-game activity for the first user and for users similar to the first user obtained from at least one social network;

filtering the data based at least in part on start time and duration of gaming software sessions to determine filtered data; and training the routine estimation model using the filtered data;

detecting a user interaction with the offer for the physical product, and in response to the detection, taking an action in a process of ordering the physical product.

16. The system of claim 15 wherein the historical activity of the first account comprises start times and associated durations of prior gaming software sessions of the first account.

17. The system of claim 15, wherein providing an offer for a physical product comprises:

predicting out of game activity based at least in part on social network data.

18. The system of claim 15 wherein the offer is determined by an routine estimation model and based at least in part on the conversion rate of the offer.

* * * * *

UNITED STATES PATENT AND TRADEMARK OFFICE
CERTIFICATE OF CORRECTION

PATENT NO.        : 11,080,736 B2                                      Page 1 of 1
APPLICATION NO.   : 16/189445
DATED             : August 3, 2021
INVENTOR(S)       : Idan Kaizerman It is certified that error appears in the above-identified patent and that said Letters Patent is hereby corrected as shown below:

In the Claims

Column 13, Line 60, in Claim 12, delete "claim 1" and insert -- claim 7 -- therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*